Nov. 12, 1940.

N. G. KELLER ET AL 2,221,194

DECORATIVE OBJECT

Filed Nov. 25, 1938

Nellie G. Keller.
William J. Keller.
INVENTOR.

BY

ATTORNEY.

Patented Nov. 12, 1940

2,221,194

UNITED STATES PATENT OFFICE 2,221,194

DECORATIVE OBJECT

Nellie G. Keller and William J. Keller, St. Louis, Mo.

Application November 25, 1938, Serial No. 242,310

1 Claim. (Cl. 41—36)

This invention relates to ornamental objects, or articles, and the method of ornamenting same.

It is an object of the invention to provide a wintery ornamented effect on the surfaces of trees, shrubs and vines, and, more particularly of the class and type employed for decorative purposes during the Christmas holiday season, although not necessarily limited thereto.

Other objects of the invention will be apparent from the following description and the drawing, it being, of course, understood that the above statements of the objects of our invention are intended to generally explain the same without limiting it in any manner.

While the drawing illustrates the invention as applied to ever-green trees and shrubs, this is merely for the purpose of illustration.

Referring to the drawing.

Articles, or objects decorated in accordance with our invention, preferably, have bodies, branches and needles, such, for instance, as ever-green trees, or leaves such as shrubs, although other articles, objects or devices, not necessarily trees or shrubs can be decorated in imitation of wintery effects in accordance with our method of ornamenting.

To produce the desired decorative effects in imitation of natural wintery ornamental effects, such as ice, sleet, or snow, or any one or all of the effects, we first dip the article, whether tree, shrub, vine or other device, in a liquid-glass solution, such for instance as silicate of soda, or in any other suitable manner apply the liquid-glass or its equivalent to the surfaces of the article, such as by squirting, or sprinkling it onto the surfaces of the article to be coated therewith. All, or only part, of the surfaces of an object to be decorated may be coated, as desired, according to the decorative effects desired.

After the above step has been accomplished, and before the liquid-glass solution has had an opportunity to dry, preferably, although not necessarily so, a mixture of glistening material such, for instance, as small pieces of mica or equivalent material, and flake-like material such, for instance, as cereal flakes, such, for instance, as white cornflakes, mineral flakes, such, for instance as gypsum rock flakes, or equivalent material is thrown, sprinkled, or in any other desirable manner applied to the liquid-glass, or surface coating of silicate of soda before it has had a chance to become dry, so as to become embedded in or attached to the surface coating by adhesion thereto as the liquid-glass becomes dry and hard as a surface coating for the article to be decorated with a wintery effect.

As much of the glistening and flaky materials may be used as will permanently adhere to the coating material as when a heavy sleet and snow effect is desired, or, if a lighter wintery effect is desired which will not hide so many of the needles of an ever-green tree treated for Christmas decorative effect, only flake material alone may be applied to the surface coating, or, if desired, a light scattering of combined glistening material and flaky material can be applied to the surface coating. However, the effects desired are entirely up to the one carrying out the method of wintery decoration of the article to be decorated.

Figure 1:
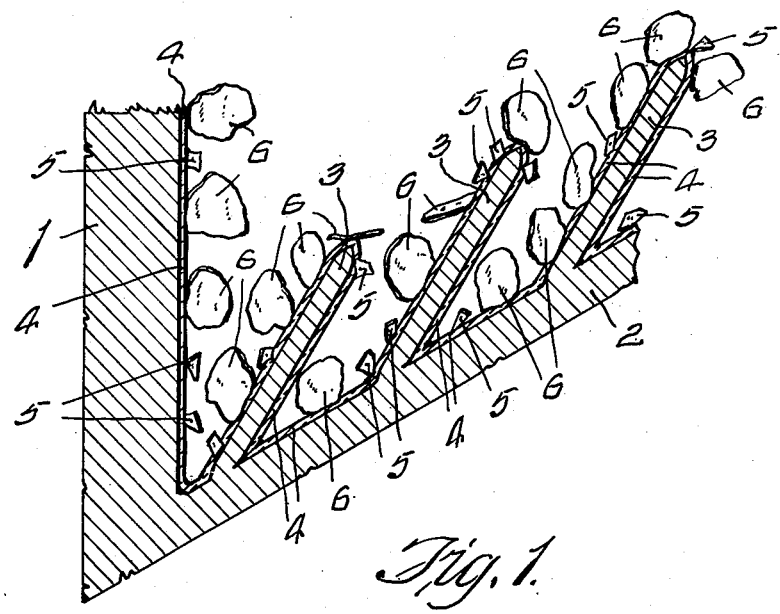
Fig. 1 is a fragmentary view of a plant, the same being shown in sectional elevation, and illustrating a surface coating in imitation of ice formation, a scattering of glistening material in imitation of sleet, and an application of flaky material in imitation of snow.
Figures 2, 3, 4:
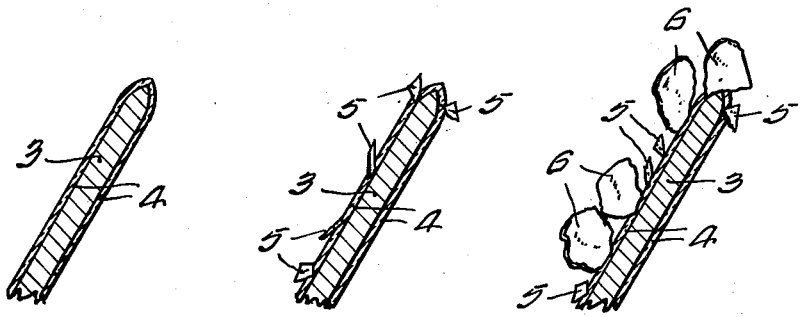
Fig. 2 is an enlarged view of an ever-green needle having a fire-proof surface coating or film only and in imitation of ice formation thereon.
Fig. 3 is an enlarged view of an ever-green needle having a fire-proof surface coating or film in imitation of ice formation thereon and a single piece of glistening material in imitation of sleet adhered to the coating.
Fig. 4 is an enlarged view of an ever-green needle having a fire-proof surface coating or protective film in imitation of ice formation thereon, a single piece of glittering material in imitation of sleet adhered to the coating, and a single piece of flaky material in imitation of a snow flake adhered to the surface coating.

In Fig. 1 of the drawing, which is illustrative only of a part of an ever-green tree, it not being believed necessary to illustrate other objects such as shrubs, vines or other articles or devices, the reference character 1 designates the body or trunk of the plane, 2 a branch projecting therefrom, and 3 a pair of needles.

The surface coating, or protective film is designated 4, and it is applied thereto in the form of silicate of soda, or liquid-glass, which becomes dry and hard, is transparent and fire-proof and resembles or imitates an ice formation on the surfaces of the article so treated.

The reference character 5 designates a glistening material which reflects light and such a material can be small pieces of mica, or equivalent material, which will resemble, or imitate sleet.

The reference character 6 designates a flake material and such material can be white corn flakes, or equivalent material which will resemble or imitate snow flakes.

It will be seen that the method of Christmas decorative effect herein described is relatively simple and inexpensive to carry out and permits of the production of articles from a wintery decorative point of view which may be formed in a great many varieties of shapes and designs, and in imitation of natural wintery effects on outdoor plants so much desired in the homes and other indoor places during the Christmas holiday season.

It is to be understood, of course, that modifications may be made in the illustrated and described embodiment of our invention without departing from our invention, and that while our invention is illustrated as applied to plants, it may be employed in many other types of ornamental articles as long as the wintery decorative effects described are carried out, which are in imitation of natural outdoor wintery decorated effects on plants.

The many advantages of the herein described invention will readily suggest themselves to those skilled in the art to which it appertains, and the many and varied decorative effects and designs possible are entirely a result of the amount of glistening material, snow flake material or the combination of both, that will finally adhere to the coating material as it dries and becomes hard.

What we claim is:

A Christmas season decoration comprising a Christmas tree or plant, a surface coating of silicate of soda thereon in imitation of ice, a scattering of gypsum rock flakes adhering to the surface coating in imitation of sleet, and a scattering of white cereal flakes adhering to the surface coating in imitation of snow producing thereby an outdoor wintery decoration for indoor display.

NELLIE G. KELLER.
WILLIAM J. KELLER.